A. WOEBER.

CARRIAGE-COUPLING.

No. 6,936. Reissued Feb. 15, 1876.

Witness:

H. A. Daniels

A. R. Lacey

Inventor:

Amandus Woeber

By W. Burris Atty.

N. PETERS, PHOTO-LITHOGRAPHER, WASHINGTON, D. C.

UNITED STATES PATENT OFFICE.

AMANDUS WOEBER, OF DAVENPORT, IOWA.

IMPROVEMENT IN CARRIAGE-COUPLINGS.

Specification forming part of Letters Patent No. 152,447, dated June 23, 1874; reissue No. 6,936, dated February 15, 1876; application filed February 7, 1876.

*To all whom it may concern:*

Be it known that I, AMANDUS WOEBER, of Davenport, in the county of Scott and State of Iowa, have invented certain new and useful improvements in Carriage Couplings; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 1:
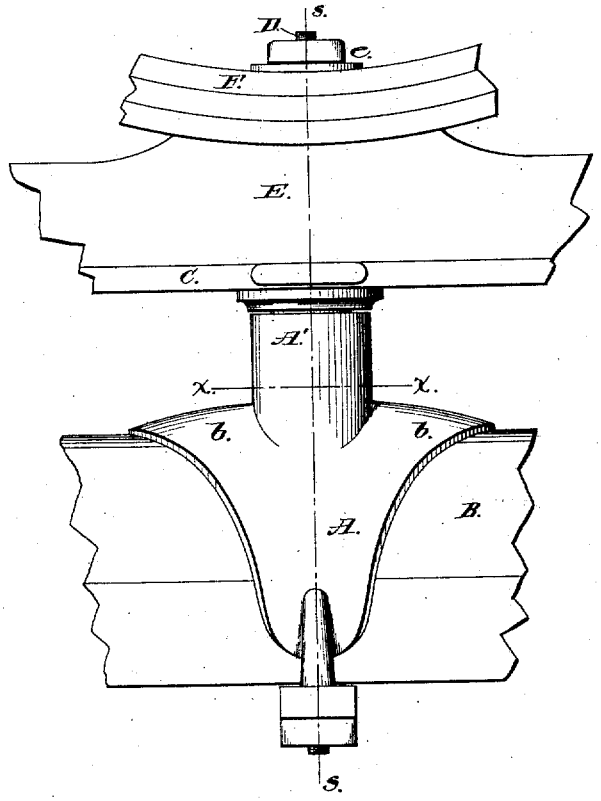
Figure 2:
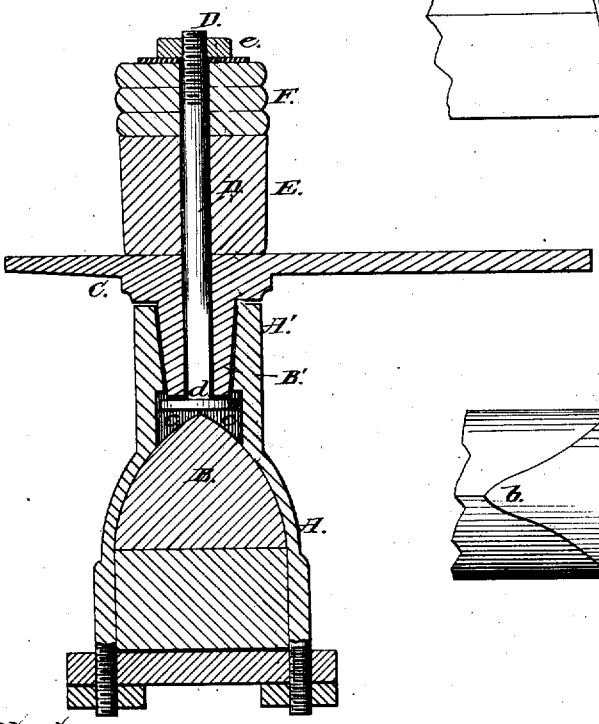
Figure 3:
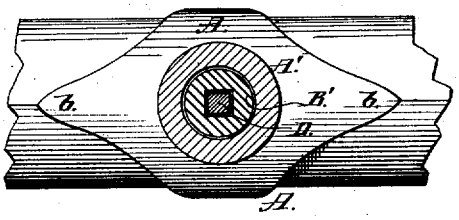

Figure 1 is a front elevation. Fig. 2 is a vertical section taken on line *s s* of Fig. 1. Fig. 3 is a transverse section of the sockets, pivot, and king-bolt, as indicated by line *x x* of Fig. 1.

My invention relates to an improved carriage-coupling and king-bolt; and consists of a clip having a socket to receive a pivotal socket on the head-block plate, and a king-bolt, which extends through the sockets and the head-block and springs. The clip is made with broad flanges, forming bearings to fit and rest on the wood part of the axle, and the socket and pivot are tapered, so as to be slightly larger at the top, and the pivotal socket extends entirely through the clip-socket and slightly below a recess formed at the bottom of the socket to receive the flanged head of the king-bolt, so that the lower end of the pivot forms the bearing of the head of the king-bolt, which is held in place by a nut on the top of the bolt.

The object of the invention is to prevent the liability existing in ordinary couplings of twisting off the king-bolt.

A represents the clip, made with flanges *b* to fit over the axle, and forming bearings sufficiently large to prevent wearing or sinking into the wood part of the axle B. A′ is the clip socket, provided with a recess, *c*, at the bottom to receive the flanged head of the king-bolt, and the socket is made to taper slightly, so that its diameter is slightly larger at the top than at the bottom. B′ is a pivotal socket on the head-block plate C, which pivot is made slightly tapering to fit the socket A′, and extends entirely through and sufficiently below the socket to form the bearing of the head of the king-bolt, as shown in Fig. 2 of the drawing. D is the king-bolt, having a flanged head, *d*, and the lower part of the bolt is square to fit the square part of its socket formed on the lower end of the pivotal socket B′, as shown in Fig. 3, so that the bolt may not turn in but with its socket. The bolt is held in place by a nut, *e*, on the upper end, by which the head *d* is tightly drawn against the lower end of the pivot B′, and the springs and head-block are firmly held on the coupling.

Instead of making the lower part of the bolt and pivotal socket square, the head of the bolt may be provided with a lip or lug to fit in a recess in the lower part of the pivot B′, to prevent the bolt from turning.

The king-bolt is introduced at the bottom of the clip socket before it is attached to the axle, and being arranged not to turn on its socket, and the head of the bolt having its bearings on the end of the pivot, as described, the coupling may be tightened by screwing down the nut *e* to any required extent without affecting in the least the free motion of the coupling, and without any liability, in use, of twisting off the bolt.

I am aware that there are clips provided with flanges and with sockets; but none of them are constructed to receive a pivotal socket through which the king-bolt passes, as herein described.

What I claim as new, and desire to secure by Letters Patent, in carriage-couplings, is—

1. A clip-socket, A′, in combination with a pivotal socket, B′, and king-bolt D, substantially as and for the purposes described.

2. The pivotal socket B′, in combination with the bed plate C, clip-socket A′, and king-bolt D, substantially as described.

3. The clip A, having flanged bearings *b*, and clip-sockets A′, having recess *c*, in combination with pivotal sockets B′, plate C, and king-bolt D, substantially as and for the purposes described.

In testimony that I claim the foregoing I have hereunto set my hand.

AMANDUS WOEBER.

Witness:

E. M. BRANNICK,

WM. F. MCLAUGHLIN.